Aug. 21, 1945.  E. MOREHOUSE  2,383,013
SAFETY CATCH
Filed Oct. 16, 1943
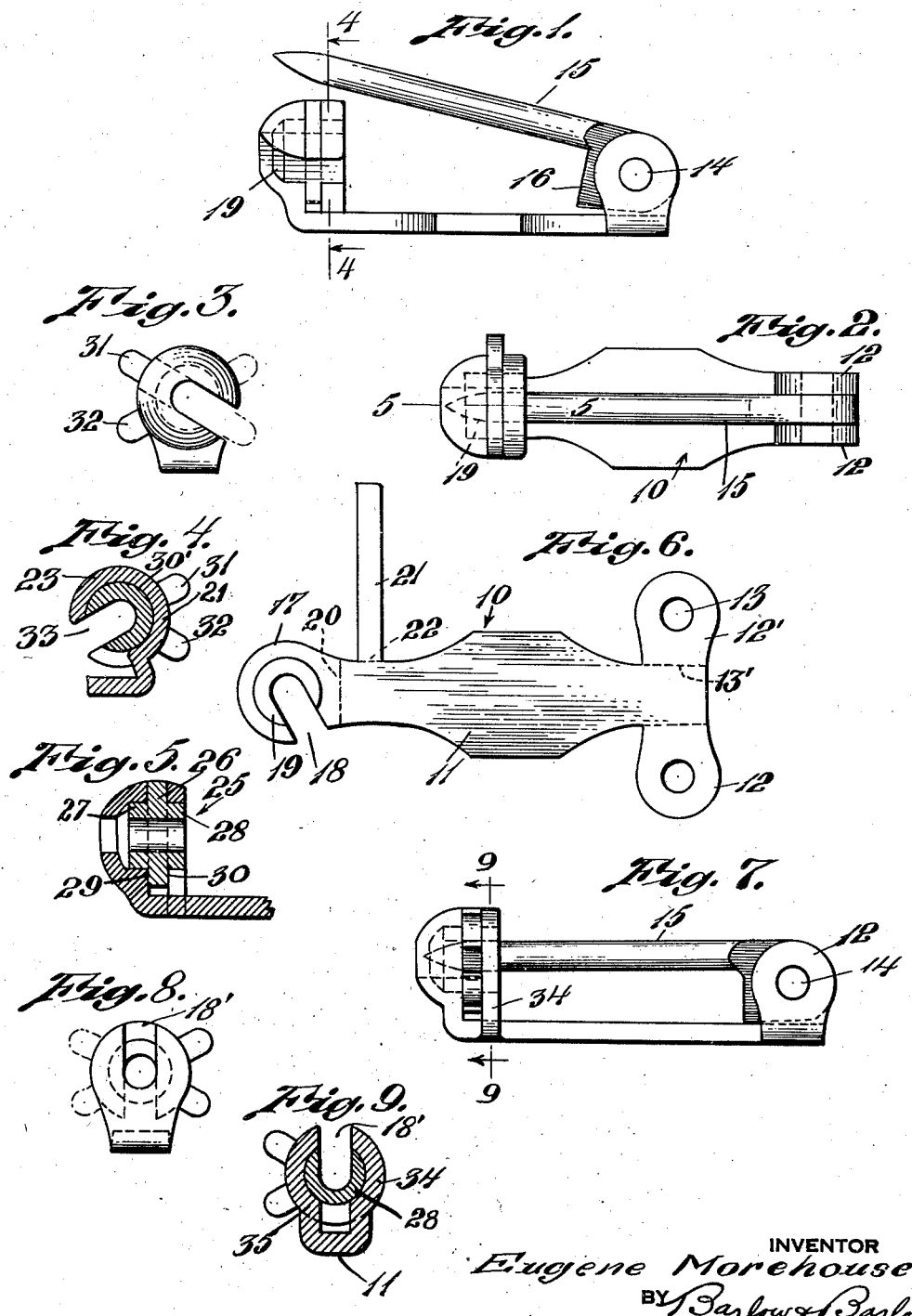
INVENTOR
Eugene Morehouse
BY Barlow & Barlow
ATTORNEYS Patented Aug. 21, 1945

2,383,013

UNITED STATES PATENT OFFICE 2,383,013

SAFETY CATCH

Eugene Morehouse, Providence, R. I., assignor to B. A. Ballou & Co. Incorporated, a corporation of Rhode Island Application October 16, 1943, Serial No. 506,537

6 Claims. (Cl. 24—157)

This invention relates to a safety catch and more particularly a safety catch which is formed at the end of a bar having a pin stem assembled therewith.

A safety catch is used for securing the end of a pin stem in position. In many situations it is desirable to use a bar having a pin stem pivotally mounted at one end and a safety catch at the other end to receive the pin stem, the bar being then assembled upon some ornament or part which it is desired to hold. Sometimes the safety catch is assembled on the bar by soldering the base of a separate safety catch on the bar.

One of the objects of this invention is to provide a safety catch and bar with the bar acting as the base of the safety catch and the parts which hold the rotor or keeper of the safety catch formed of one piece of material with the bar.

Another object of this invention is to provide a sheet stock safety catch member which may be so bent as to embrace and pivotally and rotatably mount the keeper of the safety catch.

Another object of this invention is to provide a folded safety catch of sheet stock which will require a minimum number of operations for assembly with the rotatably mounted keeper member.

Another object of the invention is to so arrange the folded parts as to require a minimum slotting for the reception of the pin stem.

With these and other objects in view, the invention consists of certain novel features of construction, as will be more fully described and particularly pointed out in the appended claims.

In the accompanying drawing:

Fig. 1 is a side elevation illustrating the assembly of bar, pin stem, and safety catch;

Fig. 2 is a top plan view thereof with the pin stem in the keeper;

Fig. 3 is an end view with the pin stem omitted;

Fig. 4 is a sectional view on substantially line 4—4 of Fig. 1 with the pin stem omitted;

Fig. 5 is a section on line 5—5 of Fig. 2 with the pin stem omitted;

Fig. 6 is a top plan view of the blank comprising the bar and parts integral therewith prior to folding;

Fig. 7 is an elevation showing a modified form;

Fig. 8 is an end view of Fig. 7 with the pin stem omitted; and

Fig. 9 is a section on line 9—9 of Fig. 7 with the pin stem omitted.

In proceeding with this invention I provide a bar with parts pivotally mounting the pin stem and also for pivotally mounting the keeper for the pin stem with these movable parts assembled therewith.

With reference to the drawing, and particularly Fig. 6, I have provided a blank designated generally 10 consisting of a bar 11 having wings 12, 12' extending laterally from either side thereof which may be folded up along a line 13' parallel to the longitudinal axis of the bar, which wings are pierced as at 13 so as to receive the trunnions 14 extending at either side of the pin stem 15 for pivotally mounting this pin stem in these wing portions 12. The shape of the pin stem is such as to provide a stop 16 to engage the bar to enable the shank portion of the pin stem 15 to be flexed and placed under some pressure when it engages the catch.

At the opposite end of the bar 11 there is an ear 17 slotted as at 18 and recessed as at 19. This ear is folded up along the dotted line 20 which extends at right angles to the longitudinal axis of the bar. An arm 21 extends laterally from the bar 11 and may be folded about a dotted line 22 at the edge of the bar which extends longitudinally of the longitudinal axis of the bar and at right angles to the line 20. This arm is curled in the shape shown in Fig. 4 at 23 to provide a bearing opposite the bearing recess 19 formed in the ear 17.

A keeper member designated generally 25 has a body portion 26 with reduced trunnions 27 and 28 on either side of this body portion 26 and which provides a shoulder 29 on one side and a shoulder 30 on the other side of this body 26. The trunnion 27 fits into the recess 19 in the ear 17 and is rotatably mounted therein as a bearing while the trunnion 28 is received in and rotatably mounted in the arc 30' of the arm 21 so as to be rotatably mounted therein. These two bearings provided by recess 19, 30' serve to rotatably mount the keeper in position while handle portions 31 and 32 extend from the body 26 for manipulation of this keeper and also to provide a limit for its rotation by their engagement with the base or bar 11. The portion of the ear 17 engages one shoulder 29 while the portion of the arm 21 engages the shoulder 30 so as to prevent the keeper from axial movement in its rotatable mounting.

The slot 18 of the ear 17 is so positioned as to act as a catch for the pin stem 15. However, the keeper is also slotted as at 33 so that when this slot registers with the slot 18 the pin stem may enter the safety catch. When the keeper is rotated the slots 18 and 33 are out of line and the pin stem can not be removed from the catch.

In some cases instead of having a single arm 21 a pair of arms 34 and 35 (Fig. 9) may extend from either side of the bar 11 to be bent up from the opposite sides thereof around the trunnion 28 and together serve as a bearing mounting for the trunnion 28.

In each case the ends of the arms 21, 23 or the ends of the arms 34, 35 will extend to a position so as to align with the slot 18 and 18' as shown in Fig. 9 so that no stock is cut away for the slot on this arm which is folded for the bearing.

I claim:

1. A safety catch for a pin stem comprising a keeper member having its opposite ends reduced to provide pivotal trunnions, an elongated base member of sheet stock having an end portion thereof extending at an angle to provide an ear to receive and provide a bearing for one keeper member trunnion and an arm extending from said base at a side edge thereof on a curvature to embrace and provide a bearing for the other keeper member trunnion whereby said members are relatively rotatably mounted, said arm and base forming at the junction thereof a fold extending at right angles to the fold formed at the junction of the base and said ear.

2. A safety catch for a pin stem comprising a keeper member having its opposite ends reduced to provide pivotal trunnions, a bar providing a base member of sheet stock having an end portion thereof extending at right angles to the length of the bar providing an ear, said ear having a recess to receive and provide a bearing for one keeper member trunnion and an arm extending from a side edge thereof and laterally of the bar inwardly from the ends thereof on a curvature to embrace and provide a bearing for the other keeper member trunnion whereby said members are relatively rotatably mounted, said arm and base forming at the junction thereof a fold extending at right angles to the fold formed at the junction of the base and said ear.

3. A safety catch for a pin stem comprising a keeper member having its opposite ends reduced to provide pivotal trunnions, a bar providing a base member of sheet stock having an end portion thereof extending at right angles to the length of the bar providing an ear, said ear having a recess to receive and provide a bearing for one keeper member trunnion and an arm extending laterally of the bar inwardly from the ends thereof on a curvature to embrace and provide a bearing for the other keeper member trunnion whereby said members are relatively rotatably mounted and a pin stem pivotally mounted at the other end of said bar, said arm and base forming at the junction thereof a fold extending at right angles to the fold formed at the junction of the base and said ear.

4. A safety catch for a pin stem comprising a keeper member having its opposite ends reduced to provide pivotal trunnions, an elongated base member of sheet stock having a portion thereof extending at an angle providing an ear to receive and provide a bearing for one keeper member trunnion, said ear being provided with a slot, an arm extending from said base on a curvature to embrace and provide a bearing for the other keeper member trunnion whereby said members are relatively rotatably mounted, the end of said arm being positioned substantially in line with an edge of said slot, said arm and base forming at the junction thereof a fold extending at right angles to the fold formed at the junction of the base and said ear.

5. A safety catch for a pin stem comprising a keeper member having a body with its opposite ends reduced to provide pivotal trunnions and forming shoulders with the body, a base member of sheet stock having a portion thereof extending at an angle providing an ear, said ear having a recess to receive and provide a bearing for one keeper member trunnion and to engage one of said shoulders and an arm extending from said base on a curvature to embrace and provide a bearing for the other keeper member trunnion and to engage the other of said shoulders whereby said members are relatively rotatably mounted and prevented from axial movement, said arm and base forming at the junction thereof a fold extending at right angles to the fold formed at the junction of the base and said ear.

6. A safety catch for a pin stem comprising a keeper member having a body with its opposite ends reduced to provide pivotal trunnions and forming shoulders with the body, a bar providing a base member of sheet stock having an end portion thereof extending at right angles to the length of the bar providing an ear, said ear having a recess to receive and provide a bearing for one keeper member trunnion and to engage one of said shoulders and an arm extending laterally of the bar inwardly from the ends thereof and on a curvature to embrace and provide a bearing for the other keeper member trunnion and to engage the other of said shoulders whereby said members are relatively rotatably mounted and prevented from axial movement, said arm and base forming at the junction thereof a fold extending at right angles to the fold formed at the junction of the base and the said ear.

EUGENE MOREHOUSE.